(12) United States Patent
Breitenbach et al.

(10) Patent No.: US 12,511,180 B2
(45) Date of Patent: Dec. 30, 2025

(54) SYSTEMS AND METHODS FOR PREDICTIVE MEMORY MAINTENANCE

(71) Applicant: SAP SE, Walldorf (DE)

(72) Inventors: Tim Breitenbach, Mitgenfeld (DE); Patrick Jahnke, Leimen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/308,474

(22) Filed: Apr. 27, 2023

(65) Prior Publication Data
US 2024/0362101 A1 Oct. 31, 2024

(51) Int. Cl.
| | | |
|---|---|---|
| G06F 11/00 | (2006.01) | |
| G06F 11/07 | (2006.01) | |
| G06N 3/0464 | (2023.01) | |
| G06N 3/047 | (2023.01) | |
| G06N 3/08 | (2023.01) | |

(52) U.S. Cl.
CPC .......... *G06F 11/076* (2013.01); *G06F 11/073* (2013.01); *G06F 11/079* (2013.01); *G06N 3/0464* (2023.01); *G06N 3/047* (2023.01); *G06N 3/08* (2013.01)

(58) Field of Classification Search
CPC .... G06F 11/076; G06F 11/073; G06F 11/079; G06N 3/0464; G06N 3/047; G06N 3/08
USPC ..................................................... 714/1–57
See application file for complete search history.

(56) References Cited

U.S. PATENT DOCUMENTS

| | | | |
|---|---|---|---|
| 6,009,545 A | 12/1999 | Tsutsui et al. | |
| 6,067,259 A | 5/2000 | Handa et al. | |
| 6,108,253 A | 8/2000 | Ohta | |
| 7,594,135 B2* | 9/2009 | Gonzalez | G06F 11/1068 714/6.1 |
| 9,378,081 B2* | 6/2016 | Dong | G06F 11/1048 |
| 10,599,504 B1 | 3/2020 | Beserra | |
| 10,887,331 B2 | 1/2021 | Nomura et al. | |
| 11,537,468 B1 | 12/2022 | Ghosh et al. | |
| 2002/0099996 A1 | 7/2002 | Demura et al. | |
| 2004/0083410 A1 | 4/2004 | Cutter | |
| 2004/0098644 A1 | 5/2004 | Wuu et al. | |
| 2004/0243891 A1 | 12/2004 | Ohta | |
| 2005/0160311 A1* | 7/2005 | Hartwell | G06F 11/076 714/6.32 |

(Continued)

OTHER PUBLICATIONS

Du, Xiaoming et al., "Predicting Uncorrectable Memory Errors from the Correctable Error History: No Free Predictors in the Field", The International Symposium on Memory Systems, 2021, 8 pages.

(Continued)

*Primary Examiner* — Sarai E Butler
(74) *Attorney, Agent, or Firm* — Fountainhead Law Group, PC

(57) ABSTRACT

Embodiments of the present disclosure include techniques for predictive memory maintenance. In one embodiment, locations of correctable errors in a memory are observed. A machine learning (ML) system may be trained with patterns of correctable errors that result in uncorrectable errors. A trained ML monitors correctable errors to predict when memory requires maintenance. In another embodiment, error rates from multiple memories are monitored to predict memory channel and other upstream device failures.

17 Claims, 7 Drawing Sheets

(56) References Cited

U.S. PATENT DOCUMENTS

| | | | |
|---|---|---|---|
| 2007/0245168 A1* | 10/2007 | Noda | G11C 15/043 |
| | | | 714/6.12 |
| 2007/0247937 A1 | 10/2007 | Moriyama et al. | |
| 2009/0006886 A1* | 1/2009 | O'Connor | G06F 11/108 |
| | | | 714/E11.034 |
| 2009/0052330 A1* | 2/2009 | Matsunaga | H04L 1/0019 |
| | | | 370/242 |
| 2009/0144579 A1 | 6/2009 | Swanson | |
| 2009/0319822 A1* | 12/2009 | Coronado | G06F 11/0727 |
| | | | 714/3 |
| 2011/0320864 A1* | 12/2011 | Gower | G06F 11/141 |
| | | | 714/E11.03 |
| 2013/0036325 A1* | 2/2013 | Matsui | G06F 11/1052 |
| | | | 714/E11.065 |
| 2014/0359367 A1* | 12/2014 | Friman | G05B 19/401 |
| | | | 714/37 |
| 2016/0085653 A1* | 3/2016 | Li | G06F 11/1076 |
| | | | 714/6.3 |
| 2018/0046541 A1* | 2/2018 | Niu | G06F 11/1048 |
| 2019/0004896 A1* | 1/2019 | Tokoyoda | G06F 12/06 |
| 2020/0066353 A1 | 2/2020 | Pletka et al. | |
| 2020/0135293 A1* | 4/2020 | Raychaudhuri | G06F 11/106 |
| 2020/0183616 A1 | 6/2020 | Liikanen | |
| 2020/0273499 A1 | 8/2020 | Jaenisch et al. | |
| 2021/0133022 A1 | 5/2021 | Chao | |
| 2021/0318922 A1 | 10/2021 | Roberts | |
| 2021/0357287 A1 | 11/2021 | Kim | |
| 2022/0050603 A1* | 2/2022 | Zhou | G06F 3/0679 |
| 2022/0156160 A1 | 5/2022 | Wang | |
| 2022/0284980 A1 | 9/2022 | Chiang | |
| 2023/0098902 A1* | 3/2023 | Desai | G11C 29/38 |
| | | | 714/6.11 |
| 2023/0205626 A1* | 6/2023 | Hernández Cortés | |
| | | | G06F 11/0772 |
| | | | 714/48 |
| 2023/0207045 A1* | 6/2023 | Chuang | G11C 29/52 |
| | | | 714/718 |
| 2023/0342245 A1 | 10/2023 | Zhang et al. | |
| 2024/0012726 A1 | 1/2024 | Thacker et al. | |

OTHER PUBLICATIONS

Du, Xiaoming et al., "Fault-Aware Prediction-Guided Page Offlining for Uncorrectable Memory Error Prevention", 2021 IEEE 39th International Conference on Computer Design (ICCD), 2021, 8 pages.

Du, Xiaoming et al., "Predicting Uncorrectable Memory Errors for Proactive Replacement: An Empirical Study on Large-Scale Field Data", 2020 16th European Dependable Computing Conference (EDCC). 2020, 6 pages.

Du, Yuyang et al., "A Rising Tide Lifts All Boats: How Memory Error Prediction and Prevention Can Help with Virtualized System Longevity", Sixth Workshop on Hot Topics in System Dependability (HotDep 10), 2010, 6 pages.

Giurgiu, Iloana et al., "Predicting DRAM Reliability in the Field with Machine Learning", Proceedings of the 18th ACM/IFIP/USENIX Middleware Conference: Industrial Track, 2017, 7 pages.

Meza, Justin et al., "Revisiting Memory Errors in Large-Scale Production Data Centers: Analysis and Modeling of New Trends from the Field", 2015 45th Annual IEEE/IFIP International Conference on Dependable Systems and Networks, 2015, 12 pages.

Schroeder, Bianca et al., "DRAM Errors in the Wild: A Large-Scale Field Study", ACM SIGMETRICS Performance Evaluation Review, 2009, 12 pages.

Second Generation Intel Xeon Scalable Processors Datasheet, vol. Two: Registers, Section 3.4, pp. 41-48, Apr. 2019, 60 pages.

Intel 64 and IA-32 Architectures Software Developer's Manual, vol. 3B: System Programming Guide, Part 2, Intel Machine Check architecture described in Chapters 15-16, pp. 43-112, Sep. 2016, 582 pages.

Intel Xeon Processor E7 Family: Reliability, Availability, and Serviceability, Advanced data integrity and resiliency support for mission-critical deployments, 2011, 16 pages.

* cited by examiner

SYSTEMS AND METHODS FOR PREDICTIVE MEMORY MAINTENANCE

CROSS REFERENCE TO RELATED APPLICATIONS

This application is related to U.S. patent application Ser. No. 18/308,470, now issued as U.S. Pat. No. 12,277,029, the contents of which are hereby incorporated herein by reference.

BACKGROUND

The present disclosure relates generally to memory systems, and in particular, to systems and methods for predictive memory maintenance.

Computer memory modules store information used by computer systems, such as computer servers, to perform tasks. Information may include data and instructions that are retrieved and used by one or more processors of the computer system to execute programs, for example. Data is stored as zeros (0) and ones (1), which are referred to as bits. One common form of memory is the random access memory (RAM). RAM modules are devices that consist of subunits which store bits. When bit errors occur, information of particular bits is lost. A single bit error can be corrected by an error correction code (ECC). However, in some cases, when two bits are corrupted, the information of the corrupted bits cannot be restored. In such an uncorrectable case, the corresponding computer program or task may fail. The ideas presented here do not depend on the concrete bit numbers that can be correct but holds true for any finite number of corrupted bits an ECC can cover. RAM is a very important component of server computers that are in turn the building blocks for modern data centers. Accordingly, memory failures are an important issue in data center operations.

The number of uncorrectable bit errors is likely to scale with the amount of physically damaged subunits within a RAM module. Consequently, to prevent server computers from severe issues, a reasonable predictive maintenance strategy is needed to focus on replacing RAM modules with the highest amount of damage first.

The present disclose is directed to techniques for predictive maintenance.

DETAILED DESCRIPTION

Described herein are techniques for predictive memory maintenance. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure include techniques for managing memory errors. Information in a memory is stored in bits that have two distinct states encoded by 0 and 1. However, it can happen that this information is corrupted due to environmental effects. Using redundancy and error correction codes (ECC), bit flips can be detected and corrected. Such errors are termed as correctable errors (CEs). However, if the number of corrupted bits is too high, then errors can only be detected but not corrected anymore. Such an uncorrectable error (UE) may result in a system crash since the read information does not match the information formerly written into the memory. Consequently, it is of interest to identify memory modules that are of high risk to fail to establish a proactive predictive maintenance strategy. The present techniques involve predicting UEs from historic CEs and spatial information between the CEs, for example. In some embodiments, a machine learning (ML) system is trained to recognize spatial patterns of CEs that have a high likelihood of producing UEs. The ML system may be used to recognize CE patterns that produce UEs and trigger alerts, for example. In another embodiment, memory errors are monitored and memory channel failures may be detected. Identifying and correcting for memory channel failures may be used to improve ML results in some embodiments, for example.

Machine Learning Analysis of Memory Errors

Figure 1:
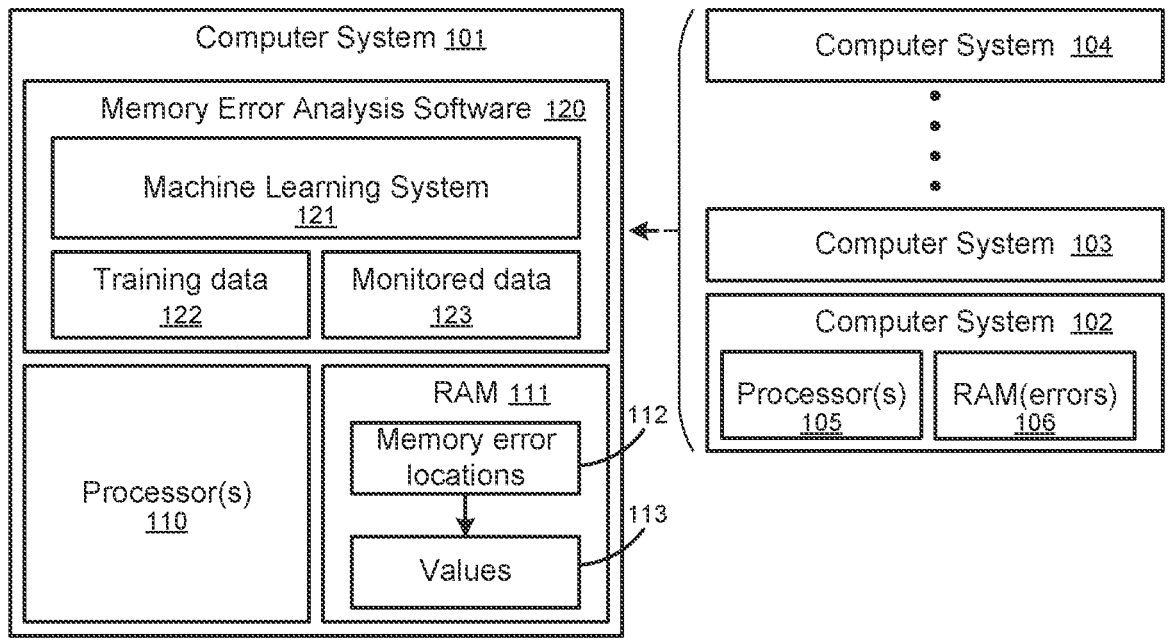
FIG. 1 illustrates a system for managing memory errors according to an embodiment.

FIG. 1 illustrates a computer system for managing memory errors according to an embodiment. Computer system 101 may be configured with memory error analysis software 120 including a machine learning system (ML) 121, training data 122, and monitored data 123 from external RAMs 106 on one or more computer systems 102-104 to trigger predictive maintenance. Computer systems 102-104 may be server computers in a data processing center, server array, or cloud computer system, for example. Computer systems 102-104 may include one or more processors 105 and RAM 106. Computer system 101 may monitor errors in RAM 106 of computer systems 102-104 either by a direct connection to each particular computer or over a local or remote network, for example.

Computer system 101 may comprise RAM 111 and one or more processors 110 for executing memory error analysis software 120. Advantageously, bit errors in RAM 106 may be detected. For each bit error, a memory error location may be determined, such as a row and a column in RAM 106 where each bit error occurred, for example. Accordingly, the row and column specify memory error locations for each detected bit error. Memory error locations 112 may be retrieved and stored in computer system 101 (e.g., in RAM 111 or a data store on a storage drive (not shown)). Additionally, in some embodiments, memory error locations 112 may be associated with a time (e.g., a time stamp, including an actual time or a date, for example).

Features and advantages of the present disclosure use memory error location data to detect UEs in a memory, ideally before they occur. As mentioned above, spatial relations between CE may be indicative of future UEs. Accordingly, locations of CEs may be monitored and processed by an ML to predict UEs before they occur. Memory error locations 112 may be received in computer system 101 from RAM 106 of computer system 102, for example. Memory error locations 112 may specify locations of correctable memory errors in RAM 106 by row and column, for example. Accordingly, the memory error locations 112 form an image of the errors in RAM 106. Memory error locations 112 may constitute monitored data 123, which may be consumed by ML 121 and may be distinguished from training data 122 used to train ML 121 as described in more detail below. Memory error locations 112 may be converted to values 113 corresponding to the memory error locations and processed by ML 121 to recognize patterns (e.g., spatial clusters) of correctable error locations resulting in uncorrectable errors, which may be spatially proximate (or nearby) the CEs in the pattern.

Memory error analysis software 120 may be used to receive and process CEs over time to periodically monitor the health of memory in computer systems 102-104. Memory error locations 112 and corresponding values may be aggregated over a first time period and processed by ML 121 to detect UEs. Subsequently, additional memory error locations 112 and corresponding values may be received and aggregated over a second time period and processed by ML 121 to detect UEs. ML 121 receives values and operates in an inference mode, where values 113 are processed by a trained ML to produce outputs indicating whether a UE is detected or not, for example. In some embodiments described in more detail below, memory error locations 112 may be converted to a multi-dimensional array of values (e.g., two-dimensions). For example, positions in the two-dimensional array may correspond to the memory error locations (e.g., rows and columns in RAM). The two-dimensional (2D) array of values may be received and processed by ML 121. In some embodiments, processing a 2D array of values is analogous to processing an image (e.g., image recognition), where the values in the 2D array correspond to various measures of CEs described in more detail below, for example.

Figure 2:
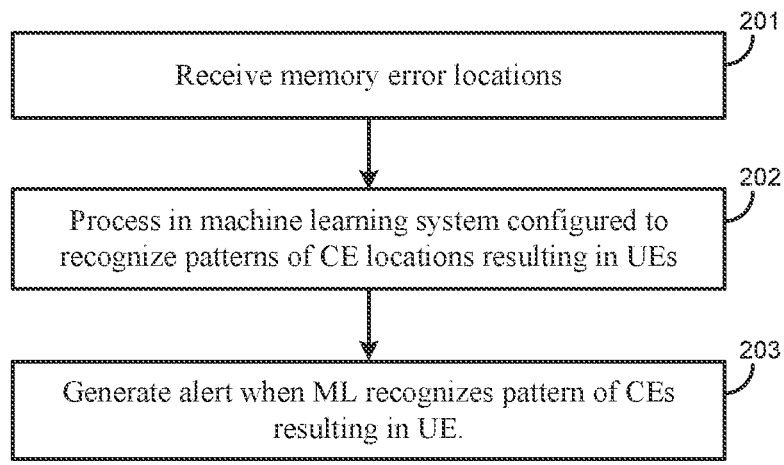
FIG. 2 illustrates a method for managing memory errors according to an embodiment.

FIG. 2 illustrates a method for managing memory errors according to an embodiment. At 201, memory error locations (e.g., for RAM 106) are received by computer system 101. At 202, a plurality of values corresponding to the memory error locations are processed in a machine learning system configured to recognize patterns of correctable error locations resulting in uncorrectable errors. The memory errors may be converted to a 2D array of values, for example. At 203, an alert is generated when the machine learning system recognizes a pattern of the error locations corresponding to an uncorrectable error.

Figure 3:
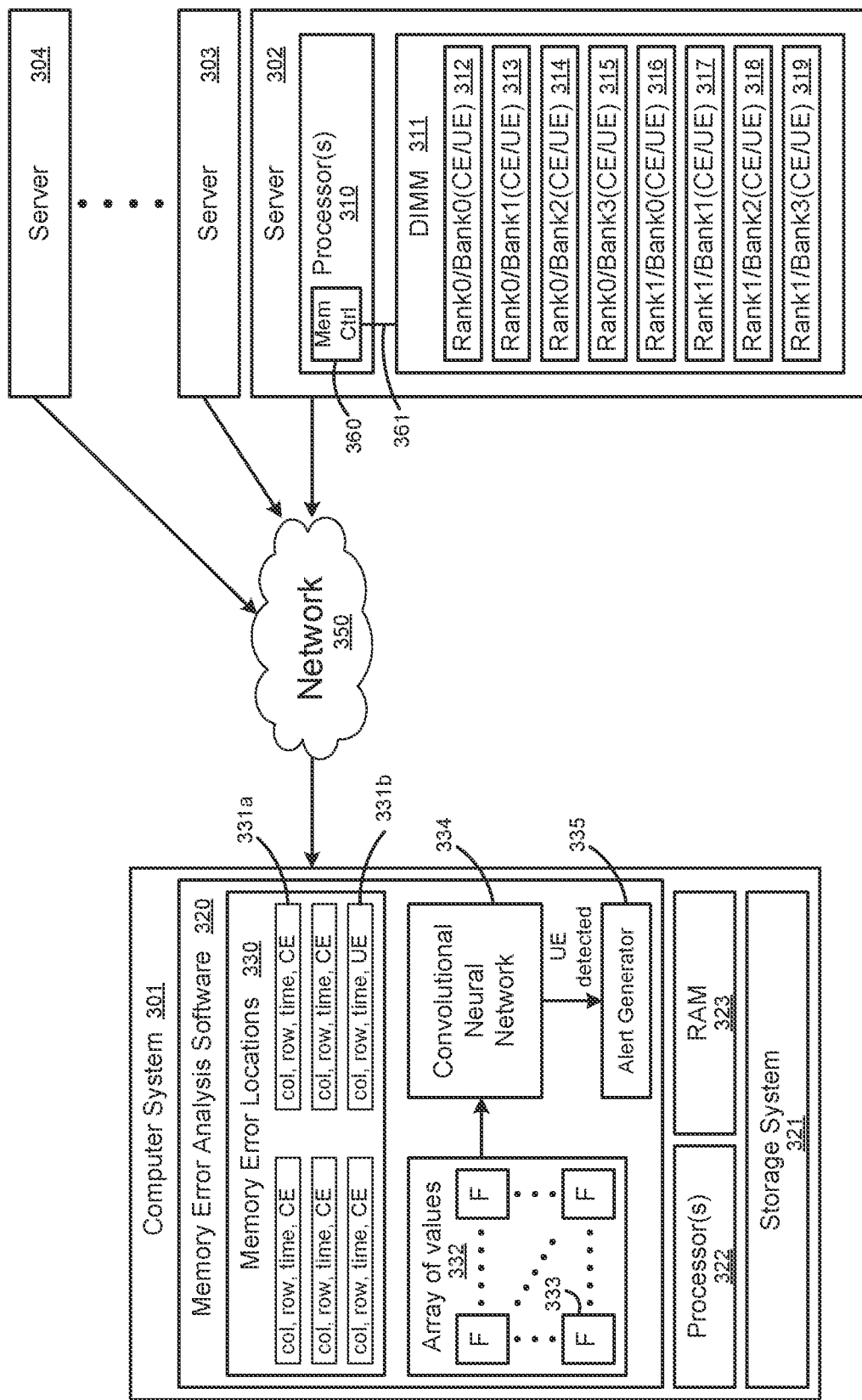
FIG. 3 illustrates an example system for managing memory errors according to another embodiment.

FIG. 3 illustrates an example system for managing memory errors according to another embodiment. In this example, servers 302-304 may comprise one or more dual in-line memory modules (DIMMs) 311. DIMM 311 may comprise a plurality of RAM integrated circuits 312-319 arranged in ranks and/or banks, for example. DIMM 311 is coupled to a memory controller 360 in processor 310 over memory channel 361. Memory errors and corresponding locations may be stored in memory controller 360. Memory controller 360 may further store an indication of whether a particular memory error was a CE or a UE, for example.

Computer system 301 may retrieve and process memory errors to predict UEs. Computer system 301 includes one or more processors 322, RAM 323, and storage system 321. Computer system 301 includes memory error analysis software 320 stored in a non-transitory computer-readable medium, such as RAM 323 or storage 321, for example. Memory error analysis software 320 may comprise computer-executable instructions that, when executed by at least one processor, performs methods of managing memory errors as described herein. Memory errors, including locations and indications of whether the errors are CEs or UEs, are retrieved from memory controller 360 across network 350, for example. Memory error locations 330 in computer system 301 may be time stamped and stored in computer system 301 as illustrated at 331a (for a correctable error, CE) and 331b (for an uncorrectable error, UE). CEs may be retrieved and processed during monitoring and inference, while both CEs and UEs may be retrieved and processed during training, for example.

Memory error location data may be converted to an array of values 332. An array of values may correspond to memory error locations for one RAM integrated circuit (IC) of a DIMM 311. For example, the array may have zero values in row and column positions corresponding to memory row and column locations where no errors were observed. The array may have non-zero values in row and column positions corresponding to memory row and column locations where errors were observed. In one embodiment, values 332 are processed as frames 333, which comprise portions of the values of the array. For example, a frame may comprise a subset of rows and subset of columns of the array 332. Frames 333 may be provided as inputs to one or more MLs for processing. In this example, the ML is a convolutional neural network 334 trained with patterns of CEs resulting in UEs as described in more detail below. Memory error locations for a whole RAM, or a total image, may comprise mostly white space (e.g., no errors). Frames may have predefined sizes so that patterns of errors are more easily detected by CNN 334, for example. Plots from a visualization tool disclosed in the related application referenced above may be used to define frame sizes. CNN 334 may be trained to recognize spatial CE patterns related to a high probability for a UE. Such row and column based CE patterns may be found by some CNN implementations due to the translation-invariant pattern identification, where the system produces the same response regardless of how the input is shifted. In addition, CNN training and recognition allows for discovery of new CE patterns that have not previously been known to produce UEs, for example.

In some embodiments, the memory error locations may focus on UEs with a CE history, and memory modules with UEs without preceding CEs are not included in training the CNN. Furthermore, memory modules that have experienced UEs that have never experienced a CE may also be excluded.

Figure 4A:
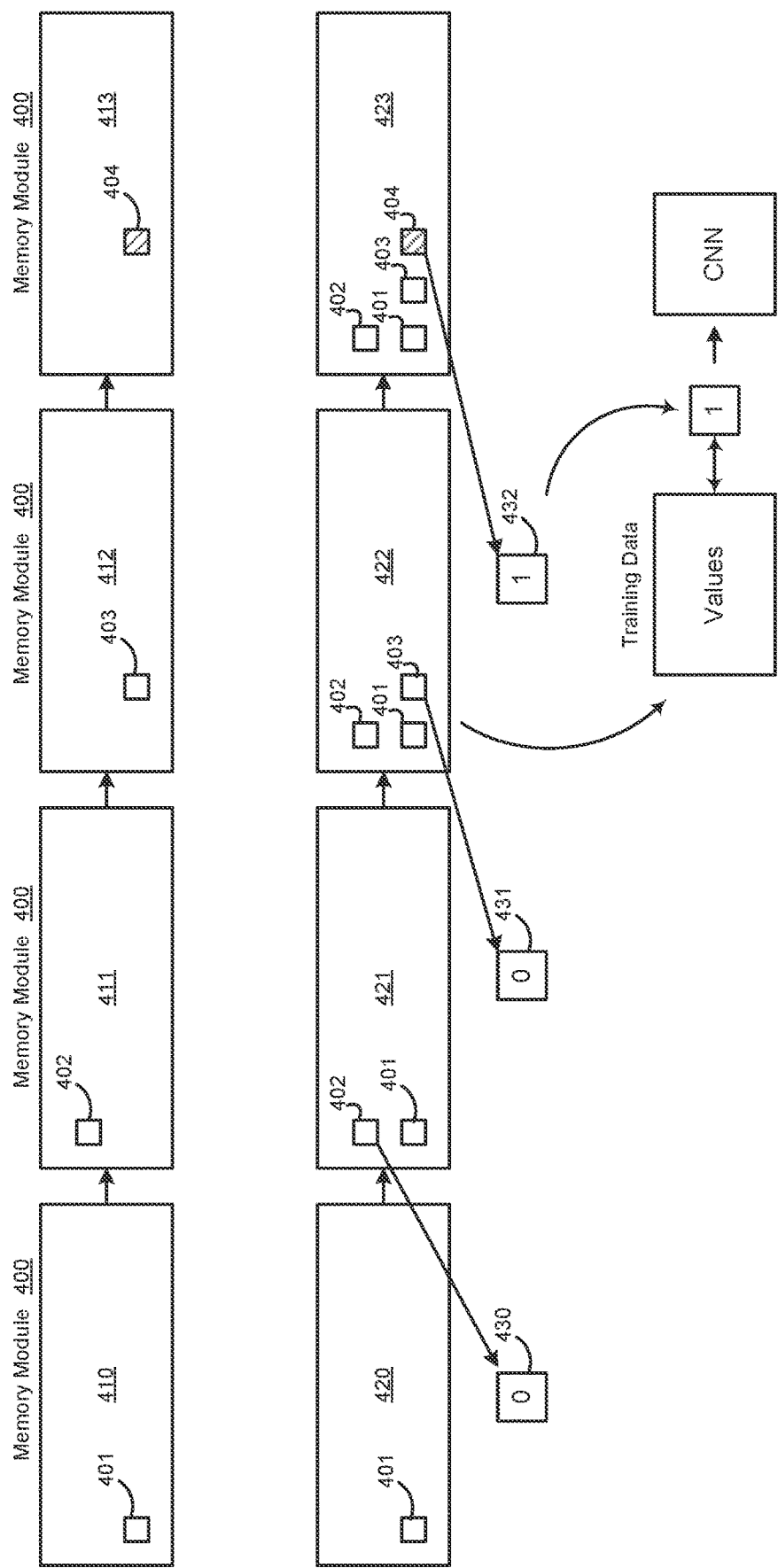
FIG. 4A illustrates an example system for training a machine learning system to detect uncorrectable errors according to an embodiment.

FIG. 4A illustrates an example system for training a machine learning system to detect uncorrectable errors according to an embodiment. This example illustrates that some memory error locations are received over a time period, and CEs may be aggregated over time. Sequence 410-413 shows a memory module 400 at four different points in time for four corresponding error events. At 410, a first CE 401 is observed at a first x,y location. At 411, a second CE 402 is observed at another x,y location. At 412, a third CE 403 is observed at yet another x,y location.

Finally, at 403, a UE is observed at a different x,y location. These errors and locations may be retrieved from a memory controller, for example, and analyzed by an ML. 420-423 illustrate aggregation of the errors over time. At 420, only the first CE 401 is shown. At 421, CEs 401-402 are aggregated and shown together to form a pattern of CE locations. Similarly, at 422, CEs 401-301 are aggregated to form a pattern. Finally, at 423, a UE is observed. 423 illustrates aggregated errors including a CE pattern and resulting UE. As described above, the pattern of CEs 401-403 in 422 may be used to predict UE 404 by an ML in inference mode. During training, such a pattern, including the UE may be used to train an ML to recognize patterns of CEs resulting in a UE, for example. For example, values corresponding to an aggregated plurality of memory error locations 401-403 may be associated with an uncorrectable error value 432 (e.g., 1) when an uncorrectable error occurs subsequent to a sequence of correctable errors forming a pattern in the aggregated memory error locations. For example, when UE 404 is observed, uncorrectable error value 432 (a flag) may be associated with aggregated memory error locations at 422 and the corresponding values they are converted into.

As described below, in some embodiments, CEs are converted to binary values. In other embodiments, CEs are converted to values between a maximum value and a minimum value (e.g., 0-1). An image of memory error locations with aggregated CE history may be encoded in values. The images may be associated with values 432, which may be 0 if the next error has been a CE (FIG. 4A, CEs 402 and 403 and values 430 and 431, respectively) and 1 if the next memory error was a UE. (FIG. 4A, UE 404 associated with a value of 1 when UE is detected). After measuring a UE, the series may be continued or stopped. In some embodiments, aggregated CEs may be encoded in various ways. In one embodiment, memory error location where a CE has been reported is encoded into black (1) while locations where a CE has not been recorded are colored white (0).

In some cases, CEs may be caused by random effects and would be gone after the next writing process in that address location and would not be an indication for physical damage of the module or a higher risk for failure. Accordingly, in another embodiment, array values may correspond to a number of times a particular error occurs at a particular memory error location. For example, CEs may be encoded with a scalar value having a minimum and maximum value. The values may count the number of CEs that occur at a particular location (e.g., multiple CEs occurring at the location of CE 402 in FIG. 4A before a UE is observed). In another embodiment, the values are normalized according to the absolute number of CEs in an image. For example, CE indicators are aggregated, and CEs with the same address location are counted and normalized by one or more CEs at an address location with the most number of CEs of a module. The issue with an absolute number of CEs could be that it depends on the amount of read bits. Assuming that a memory module is utilized quite homogeneously over all addresses, the scaling provides the hot spots of CE addresses within a module that might indicate physical damage. In such a representation, random CEs would be weighted close to zero while hotspots are close to 1 independent of the utilization. Consequently, scaling advantageously carves out the hot spots independent of the utilization for training purposes.

In another embodiment, array values correspond to an error rate. The error rate may be the number of CEs (e.g., at one or more addresses) divided by the number of bits read (e.g., at the one or more addresses). For example, a read error rate may be defined by CEs per read bits from a particular address location. Accordingly, CE error rates at particular memory locations may be used as values input to an ML (e.g., address location/pixel values vary according to a greyscale). Alternatively, another rate base approach may provide a statistic about the amount of read bits between two CEs (e.g., average number of bits read between experiencing a CE). From such information, we could derive a data driven threshold for an unusual high error rate defining hot spots of errors or use the mean or median of 1 divided by read bits between to CEs, where addresses with no CEs are ignored because as 0: =1/infinity (e.g., most address locations will have 0 CEs). In this embodiment, the system may count the read bits per address location, either by software or hardware counters to measure the read bits at addresses where there has been at least one CE, for example.

From including the read bits counters per cell, and by considering if errors appear if a 0 or a 1 is read, embodiments of the disclosure may define an image where we register stuck bits (stuck in 0 or 1, respectively). Stuck bits can be determined from memory error location data. In such a case, the error rate is (approximately) 100% if the value in which the bit is not stuck would be the correct one (e.g., 1 stuck bit can be corrected, but multiple stuck bits in the same unit cannot). Such information could be included into a second image in addition to the one discussed above.

Figure 4B:
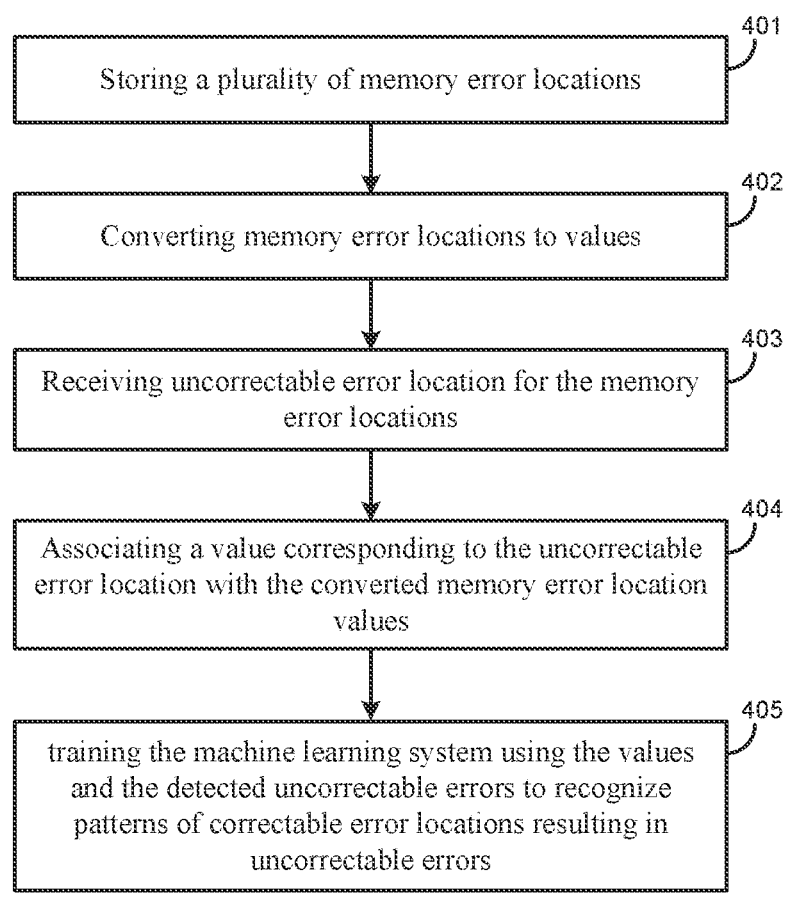
FIG. 4B illustrates a method for training a machine learning system to detect uncorrectable errors according to an embodiment.

FIG. 4B illustrates a method for training a machine learning system to detect uncorrectable errors according to an embodiment. As mentioned above, when a sequence of CEs forms a pattern leading to a UE, the aggregated CE pattern immediately preceding the UE may be associated with an uncorrectable error value of 1, representing the subsequent UE associated with the CE pattern. At 401, a plurality of memory error locations is stored in a memory system of a computer system. The memory error locations may be CEs retrieved from a memory controller of a remote processor coupled to a plurality of DIMMs each having multiple RAM ICs. CEs for individual RAMs may be for images that may be analyzed, for example. A sequence of CEs may be aggregated, where different CEs are at different locations in RAM or particular CEs may be at the same memory location and counted as part of the aggregation, for example. Aggregated CE memory error locations for a particular RAM IC on a DIMM may be converted to values. In some embodiments, the values are multi-dimensional arrays, where columns and rows correspond to x,y (e.g., col/row) locations in the memory, CEs are represented with non-zero values, and locations without errors have a zero value, for example. At 403, a UE is received for the memory error locations. The UE may indicate the end of a sequence of CE events resulting in a UE. At 404, a value corresponding to the UE location is associated with the converted memory location values. Accordingly, an array (or frame, as mentioned above) of values, representing a pattern of CEs, may be associated with a value indicating the pattern resulted in a UE. A plurality of such arrays and associated UE values may be used to train an ML, such as a CNN, to recognized patterns of CEs that result in UEs before the UEs occur. At 405, the ML system is trained using the values from the CE memory error locations and the associated UE value to recognize patterns of CE locations resulting in UEs.

Detecting Memory Channel Failures

Figure 5:
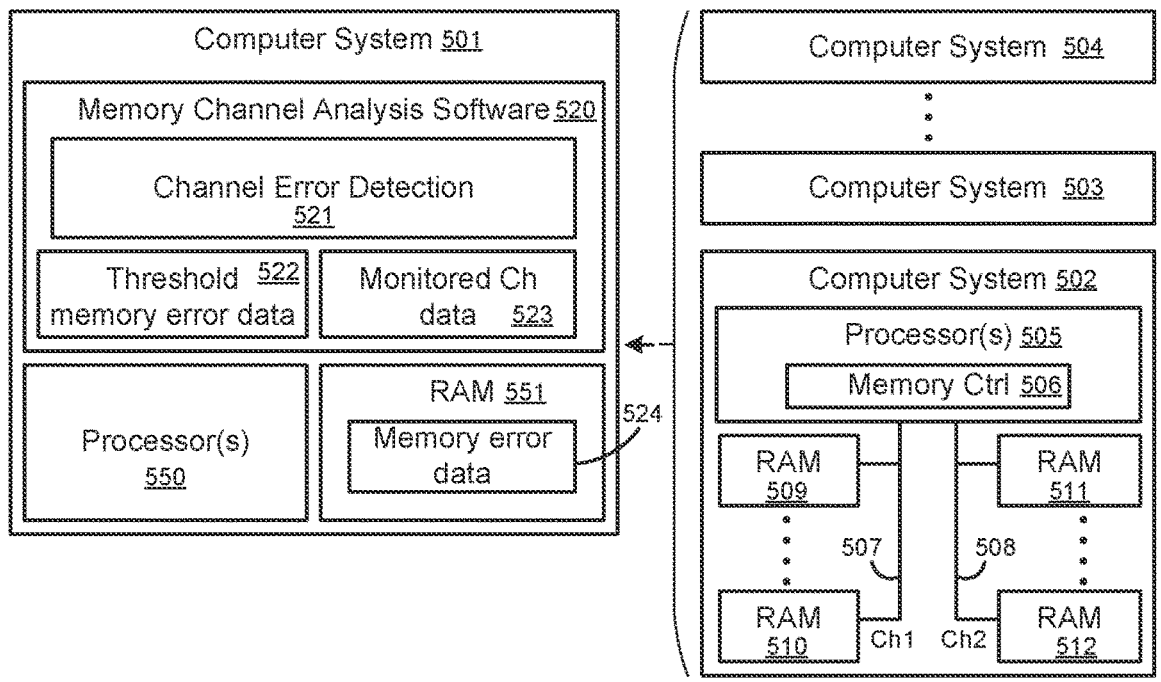
FIG. 5 illustrates a system for determining memory channel failures according to an embodiment.

FIG. 5 illustrates a system for determining memory channel failures according to an embodiment. In some cases, memory errors occur because of other damaged components involved in carrying the information from RAM to the CPU, such as a memory channel. Features and advantages of the present disclosure include a memory channel analysis software program 520 executing on one or more processors 550 of a computer system 501 to determine if memory errors are caused by a memory channel or memory controller rather than the RAM itself. For example, memory channel analysis software 520 may receive memory error data 524 from computer systems 502-505. An example computer system 502 comprises one or more processors 505 and a plurality of RAM ICs 509-512. RAM ICs 509-512 are coupled to a memory controller 506 over one or more memory channels. In this example, RAM 509-510 are coupled to memory controller 506 over memory channel (Ch1) 507 and RAM 511-512 are coupled to memory controller 506 over memory channel (Ch2) 508. Memory errors from RAM 509-510 may propagate over Ch1 to be detected and stored in memory controller 506. Similarly, memory errors from RAM 511-512 may propagate over Ch2 to be detected and stored in memory controller 506. Memory errors in memory controller 506 may be transferred to computer system 501 as "memory error data" 524 and stored in RAM 551, for example, for analysis by memory channel analysis software 520.

Features and advantages of the present disclosure include comparing a memory error rate to a threshold to determine if memory errors are caused by a memory channel, memory controller, or an error in one of the RAMs themselves. For instance, a memory may have a nominal rate of errors caused by reads of the RAM. Accordingly, from the perspective of the memory controller, the channel may experience an error rate corresponding to the error rates of the RAMs sharing the channel. However, when a channel has an error, the error rate observed in multiple RAMs may be higher concurrently than a nominal error of individual RAMs. Accordingly, memory channel analysis software 520 may receive memory error data 524 from memory controller 506 for multiple RAMs 509-510 or 511-512 coupled to memory controller 506 over a particular memory channel 507 or 508. Memory channel analysis software may determine a memory error rate from the memory error data. For example, the baseline memory error rate may be determined based on memory error data 524 over a predefined time period (e.g., number of errors for a number of read operations during a particular time). Channel error detection component 521 of software 520 may use the memory error rate of memory modules to determine broken channels or controllers or the channel error rates to detect broken memory controllers. As described in more detail below, the threshold may be based on memory error rates for a plurality of RAM on one memory channel, or multiple memory channels, during normal operation. The threshold may correspond to a memory error rate indicative of a memory channel error (or failure) rather than an error or failure in one particular RAM connected to the channel. Memory channel analysis software 520 may retrieve and process memory error data for generating a threshold (e.g., threshold memory error data 522). Threshold memory error data 522 may be memory error data for one or more channels, each having a plurality of RAMs, during normal operation. In one embodiment, threshold memory error data 522 may be analyzed to determine statistics that distinguish between RAM errors and a memory channel error, for example.

During operation, computer system 501 retrieves error data from memory controller 506 to monitor the operation of RAMs 509-512 and channels 507-509. Memory error data 524 may be periodically retrieved by memory channel analysis software 520 as monitored channel (Ch) data 523. A memory error rate below the threshold (or above the threshold, depending on the type of threshold) corresponds to a memory failure (e.g., a correctable or uncorrectable error in a particular RAM). However, a memory error rate meeting the above described threshold corresponds to a memory channel failure. In response to the memory error rate meeting the threshold, an alert may be generated for a particular memory channel (e.g., Ch1) when the memory error data (e.g., for Ch1) meets the threshold. As illustrated further below, memory error data 524 may comprise correctable errors received from a memory controller 506 for a particular memory channel (e.g., Ch1). In one embodiment, an alert is generated when a statistically significant number of concurrent correctable errors observed on multiple RAMs (e.g., RAMs 509-510) using a same memory channel (e.g., Ch1) deviates from a predetermined average number of concurrent correctable errors during normal operation by an amount greater than the threshold.

Figure 6:
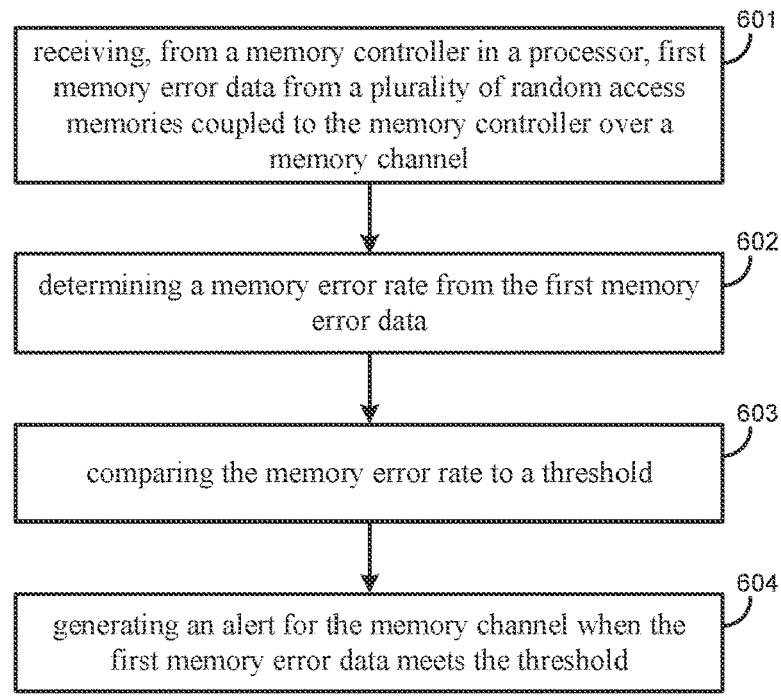
FIG. 6 illustrates a method for determining memory channel failures according to an embodiment.

FIG. 6 illustrates a method for determining memory channel failures according to an embodiment. At 601, first memory error data is received from a plurality of random access memory modules coupled to the memory controller over a memory channel. At 602, a memory error rate is determined from the first memory error data. At 603, the memory error rate is compared to a threshold. At 604, an alert is generated for the memory channel when the first memory error data meets the threshold. The alert may signal a maintenance call to evaluate and repair the memory channel in the particular computer system, for example.

Figure 7:
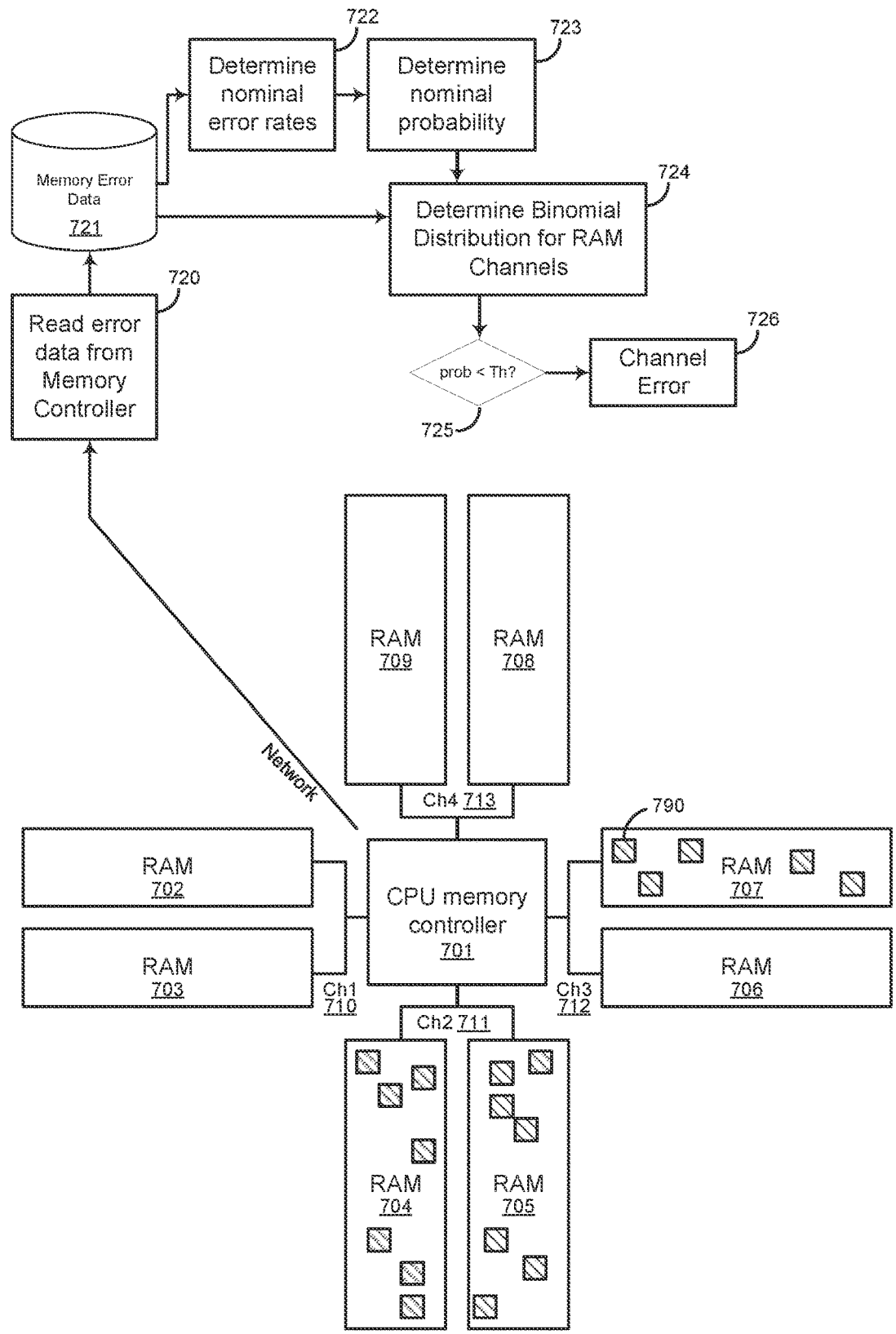
FIG. 7 illustrates an example system for determining memory channel failures according to another embodiment.

FIG. 7 illustrates an example system for determining memory channel failures according to another embodiment. In this example, a CPU memory controller 701 (processor and computer system not shown) is coupled to multiple RAM pairs 702/703, 704/705, 706/707, and 708/709 over memory channels 710-713 (Ch1-Ch4), respectively. In some embodiments, RAMs 702-709 are dual in-line memory modules (DIMMs) on a server computer system. While pairs of memory modules on a same channel are shown here for illustrative purposes, it is to be understood that different numbers of RAM may be coupled to a memory controller on the same channel in other embodiments. Additionally, different memory controllers may have different numbers of memory channels than shown in this illustrative example. In FIG. 7, RAM 707 produces memory errors (depicted as shaded squares 790). The memory errors are coupled to memory controller 701 over memory channel 712. However, memory controller 701 may also receive memory errors for multiple RAMs 704 and 705 over memory channel 711. The increase in errors across multiple RAMs 704/705 sharing memory channel 711 may indicate a channel problem rather than a problem with a particular RAM. In this example, RAMs 702, 703, 708, and 709 present no errors.

FIG. 7 further illustrates an example process for distinguishing memory channel errors from memory errors. At 720, memory error data is read from memory controller 701 and loaded into a data store 721 (e.g., a local RAM or storage device on another computer system). During a threshold determination phase, memory error data for RAMs 702-709 on channels 710-713 may be received and stored in data store 721. At 722, nominal memory error rates may be determined (e.g., memory error rates on a plurality of memory modules sharing memory channels). In some embodiments, memory errors caused by a memory channel may be determined from statistically significant concurrent CEs (over some predefined time period or specified number of reads) signaling an unlikely high error rate on multiple memory modules for the same channel (or analogously, a memory controller) that deviates from an average by an amount greater than a threshold (e.g., determined by statistical means like a Binomial distribution). For instance, an average over multiple DIMM modules may be determined as a nominal error rate (e.g., CEs per read bit; which is the error rate for a Binomial distribution) to set a threshold, and outliers observed during system operation may indicate a broken memory channel. Error rates may capture broken channels with different read rates. Measuring memory error rate advantageously captures memory utilization. For example, since error rate is the number of errors divided by the number of reads, increases in memory errors caused by memory channels, versus the memory modules themselves, may advantageously track from a lower number of reads to a high number of reads (e.g., error rate=#errors/#reads).

As mentioned above, statistics of the memory error rate may be used to decide on a level of significance if the error rates of all memory modules of a channel are higher than the ones of other memory modules of other channels. The high error rate of each memory module during a predefined number of reads may indicate a broken channel.

Referring again to FIG. 7, in this example a nominal probability is determined at 723. The nominal probability may be an expected value of an error rate (e.g., all memory modules in one server), based on error rate data, during proper operation of a memory channel, for example. The nominal probability may be used as a baseline (e.g., either as a threshold or to determine a deviation greater than a threshold). In one embodiment, a Binomial distribution may be used to detect memory errors occurring during system operation. The Binomial distribution is as follows:

$$f(k, n, p) = Pr(k; n, p) = Pr(X = k) = \binom{n}{k} p^k (1-p)^{n-k},$$

wherein "n" is the integer number of read bits, "k" is the integer number of errors (e.g., correctable memory errors) within the "n" read bits, "p" is a nominal probability corresponding to normal operation, and f(k,n,p) is a probability between 0 and 1 of "k" or more correctable errors within the "n" read bits for the nominal probability "p". Nominal probability "p" may be determined at 723 using memory error data collected for one or more channels during normal operation (e.g., memory modules for channels, and channels for memory controller). Correctable errors observed over various read bit values may be aggregated and used to determine "p". During system operation, such as an error detection phase, additional memory errors may be read and stored in data storage 721 and used, with nominal probability "p" to determine a Binomial distribution. Accordingly, "n" and "k" may be chosen accordingly before operation to determine if a memory channel is inoperative since corresponding memory modules have a high CE number compared to n read bits. As mentioned above, the output of the Binomial distribution is a probability of "k" correctable errors within the "n" read bits for the nominal probability "p". The output of the Binomial framework is the probability to have k or more errors within n read bits. A Binomial output closer to 0 indicates an unusually high error rate per module. If sufficient modules (e.g., all) have such an unusually high error rate, it will indicate an error in the memory channel, where a Binomial output closer to 1 indicates a memory channel operating consistent normal operation, for example. Accordingly, embodiments of memory channel analysis software 520 may determine, from the memory error data 721, a probability of "k" correctable memory errors within "n" read bits for a predefined probability "p" corresponding to normal operation (obtained at 723) using the above Binomial distribution, and then compare the output probability of k to a threshold (e.g., a value between 0 and 1 to set a maximum deviation from nominal operation; p-value) for each module. If all modules for the same channel (or all modules/channels for one memory controller) have an unusually high error rate, the channels, or the memory controller, respectively, may be faulty.

In this example, deviation from nominal operation may be determined for multiple memory modules using a shared channel. First, a check is made to determine if one module is an outlier. At 724, the Binomial distribution may be determined on all RAMs on the memory channel. At 725, the output probability ("prob") of the Binomial framework is compared to a threshold for each module. If the output is lower than the threshold, (p-value) for having equal or more than k errors for each memory, the system may indicate a channel error.

The present techniques may be extended for additional upstream components. For example, analogously for a memory controller, if all memory modules across all channels (or all channels) of the memory controller have a higher error rate than other memory controllers, then the memory controller itself may be flagged as faulty. Similarly, for memory modules in a particular socket, if all memory modules across a particular socket have a higher error rate than other memories in other sockets, then the memory socket itself may be flagged as faulty. Accordingly, using hardware counters for read bits on a particular level (e.g., rank level), we can define an average CE error rate for each component class, such as channels, memory controllers, or slots, for example. For a suitable chosen number of read bits and an observed number of CEs within that number, we can test with the Binomial (Bernoulli) distribution for each instance of a component class (e.g., certain memory modules or channels of the server or data center(s)) if the observed number of CEs within a number of read bits is unlikely assuming the average error rate of that class (like all memory modules or all channels of the server).

Referring to the ML techniques described above, embodiments of the disclosure may denoise the ML data as much as possible. For example, CEs resulting from memory channel failure detected above may be deleted from the CE memory error location data sets (e.g., images) the ML processes (e.g., in training or inference) if it turns out that a component different from the module (e.g., a memory channel) is broken. Memory modules may have an associated unique ID and the CE addresses within the servers, which can be identified, and the corresponding CEs may be deleted.

Figure 8:
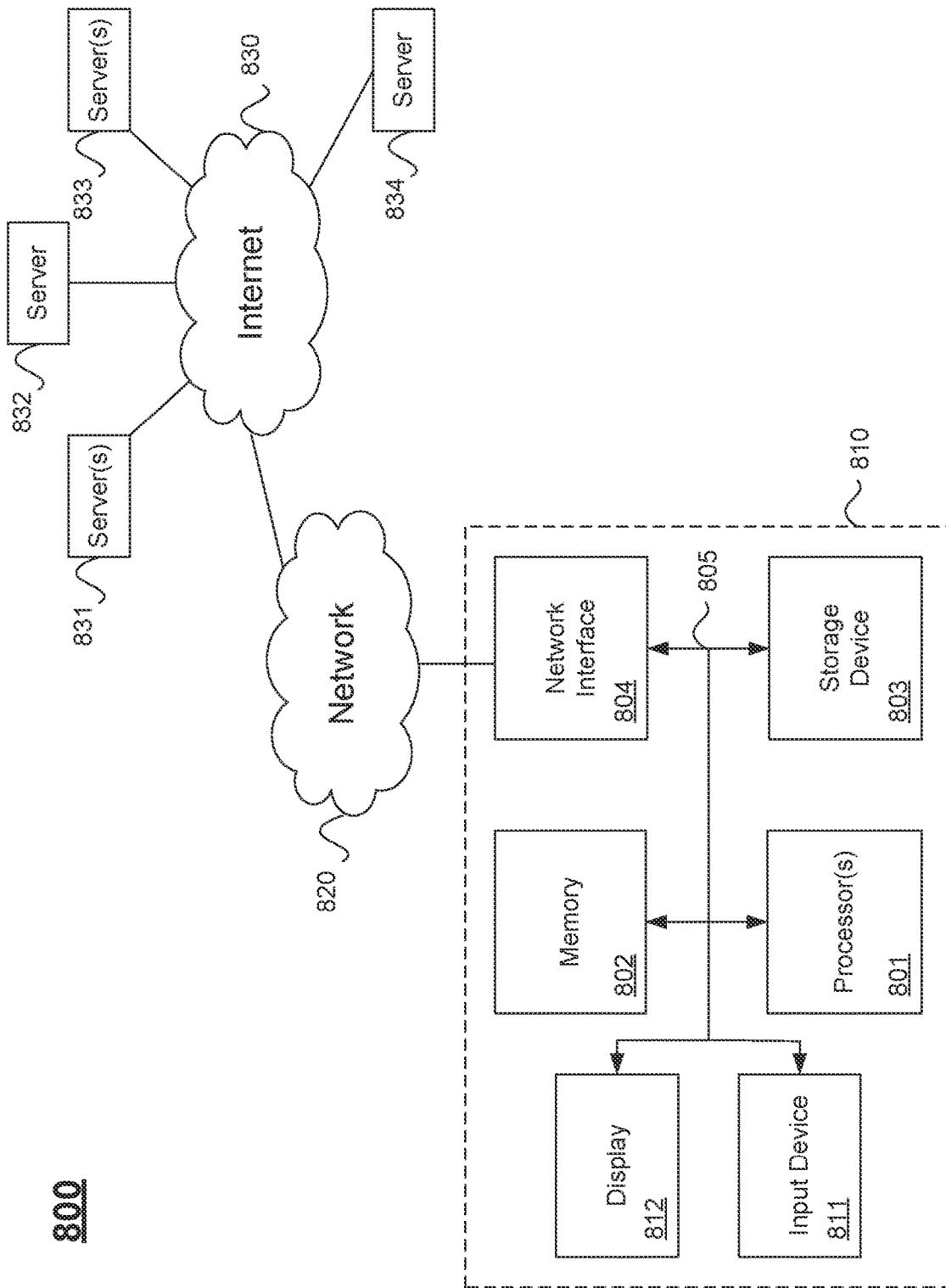
FIG. 8 is an example computer hardware system with an improved document validation system according to an embodiment.

FIG. 8 illustrates hardware of a special purpose computing machine configured according to the above disclosure. The following hardware description is merely one example. It is to be understood that a variety of computer topologies may be used to implement the above described techniques. An example computer system 810 is illustrated in FIG. 8. Computer system 810 includes a bus 805 or other communication mechanism for communicating information, and one or more processor(s) 801 coupled with bus 805 for processing information. Computer system 810 also includes memory 802 coupled to bus 805 for storing information and instructions to be executed by processor 801, including information and instructions for performing some of the techniques described above, for example. Memory 802 may also be used for storing programs executed by processor(s) 801. Possible implementations of memory 802 may be, but is not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 803 may include source code, binary code, or software files for performing the techniques above, for example. Storage device 803 and memory 802 are both examples of non-transitory computer readable storage mediums (aka, storage media).

Computer system 810 may be coupled via bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses for coupling various components of the computer together, for example.

Computer system 810 also includes a network interface 804 coupled with bus 805. Network interface 804 may provide two-way data communication between computer system 810 and a local network 820. Network 820 may represent one or multiple networking technologies, such as Ethernet, local wireless networks (e.g., WiFi), or cellular networks, for example. The network interface 804 may be a wireless or wired connection, for example. Computer system 810 can send and receive information through the network interface 804 across a wired or wireless local area network, an Intranet, or a cellular network to the Internet 830, for example. In some embodiments, a front end (e.g., a browser), for example, may access data and features on backend software systems that may reside on multiple different hardware servers on-prem 831 or across the Internet 830 on servers 832-835. One or more of servers 832-835 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

Embodiments of the present disclosure include techniques for predictive memory maintenance.

In one embodiment, the present disclosure includes a method of managing memory errors comprising: receiving memory error locations; processing a plurality of values corresponding to the memory error locations in a machine learning system configured to recognize patterns of correctable error locations resulting in uncorrectable errors; and generating an alert when the machine learning system recognizes a pattern of the error locations corresponding to an uncorrectable error.

In one embodiment, the memory error locations correspond to correctable memory errors.

In one embodiment, the plurality of values is received in the machine learning system as a two-dimensional array of values, and wherein positions in the two-dimensional array correspond to the memory error locations.

In one embodiment, the memory error locations are processed in predefined frames, and wherein the predefined frames are a subset of the two-dimensional array of values.

In one embodiment, the memory error locations are received over a time period, and wherein the plurality of values aggregate the received memory error locations over the time period.

In one embodiment, the plurality of values is a plurality of binary values.

In one embodiment, the plurality of values is a plurality of values between a maximum value and a minimum value.

In one embodiment, a first value of the plurality of values corresponds to a number of times a particular error occurs at a particular memory error location.

In one embodiment, a first value of the plurality of values corresponds to an error rate.

In one embodiment, a first value of the plurality of values corresponds to a number of bits read between errors for a particular memory error location.

In one embodiment, the plurality of values corresponding to the memory error locations are a first plurality of values, the method further comprising processing a second plurality of values corresponding to the memory error locations in a machine learning system configured to recognize patterns of correctable error locations resulting in uncorrectable errors, wherein the first plurality of values corresponds to aggregated memory error locations over a first time period and the second plurality of values corresponds to aggregated memory error locations over a second time period.

In one embodiment, the plurality of memory error locations are a first plurality of memory error locations and the plurality of values corresponding to the memory error locations are a first plurality of values, the method further comprising; storing a second plurality of memory error locations; converting the second plurality of memory error locations into a second plurality of values; detecting uncorrectable errors for at least a portion of the second plurality of memory error locations; and training the machine learning system using the second plurality of values and the detected uncorrectable errors to recognize patterns of correctable error locations resulting in uncorrectable errors.

In one embodiment, the method further comprising associating values corresponding to an aggregated plurality of memory error locations with an uncorrectable error value when an uncorrectable error occurs subsequent to a plurality of correctable errors in the aggregated plurality of memory error locations.

In one embodiment, the machine learning system is a convolutional neural network.

In one embodiment, the memory is a dynamic random access memory on a dual in-line memory module comprising a plurality of dynamic random access memories.

In one embodiment, the memory error locations comprise first memory error data from a plurality of random access memories coupled to a memory controller over a memory channel, the method further comprising: determining a memory error rate from the first memory error data; comparing the memory error rate to a threshold; and eliminating the first memory error data from the memory error locations when the memory error rate is above the threshold.

In another embodiment, the present disclosure includes a method of managing memory errors comprising: receiving, from a memory controller in a processor, first memory error data from a plurality of random access memories coupled to the memory controller over a memory channel; determining a memory error rate from the first memory error data; comparing the memory error rate to a threshold; and generating an alert for the memory channel or memory controller when the first memory error data meets the threshold.

In one embodiment, the memory error rate is determined based on the first memory error data over a predefined time period.

In one embodiment, the first memory error data comprises a plurality of correctable errors on the plurality of random access memories on a dual in-line memory module of a server, and wherein the plurality of random access memories are coupled to the memory controller over a same memory channel.

In one embodiment, the threshold is based on memory error rates for a plurality of random access memories on a plurality of memory channels during normal operation.

In one embodiment, the alert is generated when a statistically significant number of concurrent correctable errors observed on a plurality of random access memories using a same memory channel deviates from a predetermined average number of concurrent correctable errors during normal operation by an amount greater than the threshold.

In one embodiment, determining the memory error rate from the first memory error data comprises determining a plurality of memory error rates for particular random access memories, and wherein comparing the memory error rate to the threshold comprises: comparing a first memory error rate for a first random access memory to the threshold; and comparing a second memory error rate for a second random access memory using a same memory channel to the threshold, wherein the alert is generated in response to the first and second memory error rates for first and second random access memories using the same memory channel both meet the threshold.

In one embodiment, comparing the memory error rate to a threshold comprises determining, from the memory error data, a probability of k or more correctable memory errors within n read bits for a predefined probability p corresponding to normal operation using the following Binomial distribution:

$$f(k, n, p) = Pr(k; n, p) = Pr(X = k) = \binom{n}{k} p^k (1-p)^{n-k},$$

and
comparing the probability of k to the threshold, where n and k are integers and p is a real number between 0 and 1.

In one embodiment, further comprising determining a faulty memory controller based on a plurality faulty memory channels.

In some embodiments, the present disclosure includes a system for managing memory errors comprising: at least one processor and at least one non-transitory computer readable medium storing computer executable instructions that, when executed by the at least one processor, cause the system to perform actions of the above described methods and techniques disclosed herein. In another embodiment, the present disclosure includes a non-transitory computer-readable medium storing computer-executable instructions that, when executed by at least one processor, perform the above described methods of managing memory errors and techniques disclosed herein.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising: receiving, by a first computer system over a network, memory error data from a second computer system remote from the first computer system, wherein the memory error data pertains to memory errors detected with respect to a plurality of random access memory (RAM) modules of the second computer system that are coupled to a memory controller of the second computer system via a single memory channel, and wherein the memory error data includes, for each RAM module in the plurality of RAM modules, a number of correctable memory errors detected for the RAM module and a number of bits read from the RAM module; for each RAM module in the plurality of RAM modules: determining, by a processor of the first computer system, a memory error rate based on the number of correctable memory errors detected for the RAM module and the number of bits read from the RAM module; and comparing, by the processor of the first computer system, the memory error rate to a threshold; and upon determining that the memory error rate for every RAM module in the plurality of RAM modules deviates from the threshold, generating, by the processor of the first computer system, an alert indicating a problem with the single memory channel on the second computer system.

2. The method of claim 1, wherein the memory error rate is determined with respect to a predefined time period during which the number of bits were read from the RAM module.

3. The method of claim 1, wherein each RAM module is a dual in-line memory module, and wherein the second computer system is a server in a data center.

4. The method of claim 1, wherein the threshold is based on memory error rates for a plurality of RAM modules on a plurality of memory channels during normal operation.

5. The method of claim 1, wherein the alert is generated when a statistically significant number of concurrent correctable errors observed for each RAM module in the plurality of RAM modules deviates from a predetermined average number of concurrent correctable errors during normal operation by an amount greater than the threshold.

6. The method of claim 1, wherein comparing the memory error rate to a threshold comprises determining, from the memory error data, a probability of k or more correctable memory errors within n read bits for a predefined probability p corresponding to normal operation using the following Binomial distribution:

$$f(k, n, p) = Pr(k; n, p) = Pr(X = k) = \binom{n}{k} p^k (1-p)^{n-k},$$

and
comparing the probability of k to the threshold, where n and k are integers and p is a real number between 0 and 1.

7. The method of claim 1, further comprising determining a faulty memory controller in the second computer system based on a plurality faulty memory channels.

8. A computer system comprising: at least one processor; and at least one non-transitory computer readable medium storing computer executable instructions that, when executed by the at least one processor, cause the computer system to perform actions comprising: receiving, over a network, memory error data from a second computer system remote from the first computer system, wherein the memory error data pertains to memory errors detected with respect to a plurality of random access memory (RAM) modules of the second computer system that are coupled to a memory controller of the second computer system via a single memory channel, and wherein the memory error data includes, for each RAM module in the plurality of RAM modules, a number of correctable memory errors detected for the RAM module and a number of bits read from the RAM module; for each RAM module in the plurality of RAM modules: determining a memory error rate based on the number of correctable memory errors detected for the RAM module and the number of bits read from the RAM module; and comparing the memory error rate to a threshold; and upon determining that the memory error rate for every RAM module in the plurality of RAM modules deviates from the threshold, generating an alert indicating a problem with the single memory channel on the second computer system.

9. The computer system of claim 8, wherein the memory error rate is determined with respect to a predefined time period during which the number of bits were read from the RAM module.

10. The computer system of claim 8, wherein each RAM module is a dual in-line memory module, and wherein the second computer system is a server.

11. The computer system of claim 8, wherein the threshold is based on memory error rates for a plurality of RAM modules on a plurality of memory channels during normal operation.

12. The computer system of claim 8, wherein the alert is generated when a statistically significant number of concurrent correctable errors observed for each RAM module in the plurality of RAM modules deviates from a predetermined average number of concurrent correctable errors during normal operation by an amount greater than the threshold.

13. The computer system of claim 8, wherein comparing the memory error rate to a threshold comprises determining, from the memory error data, a probability of k or more correctable memory errors within n read bits for a predefined probability p corresponding to normal operation using the following Binomial distribution:

$$f(k, n, p) = Pr(k; n, p) = Pr(X = k) = \binom{n}{k}p^k(1-p)^{n-k},$$

and
comparing the probability of k to the threshold, where n and k are integers and p is a real number between 0 and 1.

14. A non-transitory computer-readable medium storing computer-readable medium storing computer-executable instructions that, when executed by at least one processor of a first computer system, perform a method comprising: receiving, by a first computer system over a network, memory error data from a second computer system remote from the first computer system, wherein the memory error data pertains to memory errors detected with respect to a plurality of random access memory (RAM) modules of the second computer system that are coupled to a memory controller of the second computer system via a single memory channel, and wherein the memory error data includes, for each RAM module in the plurality of RAM modules, a number of correctable memory errors detected for the RAM module and a number of bits read from the RAM module; for each RAM module in the plurality of RAM modules: determining, by a processor of the first computer system, a memory error rate based on the number of correctable memory errors detected for the RAM module and the number of bits read from the RAM module; and comparing, by the processor of the first computer system, the memory error rate to a threshold; and upon determining that the memory error rate for every RAM module in the plurality of RAM modules deviates from the threshold, generating, by the processor of the first computer system, an alert indicating a problem with the single memory channel on the second computer system.

15. The non-transitory computer-readable medium of claim 14, wherein the threshold is based on memory error rates for a plurality of RAM modules on a plurality of memory channels during normal operation.

16. The non-transitory computer-readable medium of claim 14, wherein the alert is generated when a statistically significant number of concurrent correctable errors observed for each RAM module in the plurality of RAM modules deviates from a predetermined average number of concurrent correctable errors during normal operation by an amount greater than the threshold.

17. The non-transitory computer-readable medium of claim 14, wherein comparing the memory error rate to a threshold comprises determining, from the memory error data, a probability of k or more correctable memory errors within n read bits for a predefined probability p corresponding to normal operation using the following Binomial distribution:

$$f(k, n, p) = Pr(k; n, p) = Pr(X = k) = \binom{n}{k}p^k(1-p)^{n-k},$$

and
comparing the probability of k to the threshold, where n and k are integers and p is a real number between 0 and 1.

* * * * *